United States Patent
Kim et al.

(10) Patent No.: US 8,125,161 B2
(45) Date of Patent: Feb. 28, 2012

(54) LIGHT EMITTING DEVICE DRIVING APPARATUS AND METHOD FOR DRIVING THE SAME

(75) Inventors: Hyo Young Kim, Suwon-si (KR); Sung Hun Oh, Suwon-si (KR); Jin Hwan Kim, Suwon-si (KR); Jong Rak Kim, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 288 days.

(21) Appl. No.: 12/591,737

(22) Filed: Nov. 30, 2009

(65) Prior Publication Data

US 2010/0320921 A1  Dec. 23, 2010

(30) Foreign Application Priority Data

Jun. 19, 2009 (KR) .................. 10-2009-0055071

(51) Int. Cl.
*G05F 1/00* (2006.01)
(52) U.S. Cl. ............. 315/291; 315/294; 315/169.1; 315/224; 315/312; 345/691; 345/46; 327/172
(58) Field of Classification Search ........... 315/169.1, 315/291, 294, 224, 300, 312; 345/39, 42, 345/46, 82, 691; 327/108, 109, 172
See application file for complete search history.

(56) References Cited

U.S. PATENT DOCUMENTS

| 6,989,701 | B2 * | 1/2006 | Lin et al. .................. 327/175 |
| 7,115,888 | B2 * | 10/2006 | Hachiya et al. ............ 250/552 |
| 7,916,101 | B2 * | 3/2011 | Oyama .......................... 345/82 |
| 2011/0109228 | A1 * | 5/2011 | Shimomura et al. ........ 315/113 |

FOREIGN PATENT DOCUMENTS

KR  10-2007-0104804  10/2007

* cited by examiner

*Primary Examiner* — Haiss Philogene

(57) ABSTRACT

The present invention relates to a light emitting device (LED) driving apparatus that constantly maintains the average current flowing onto a plurality of channels. The light emitting device (LED) driving apparatus includes: a LED light source unit in which at least one LED channel is connected in parallel; at least one current detector that is disposed on a low end of a LED channel of the LED light source unit to detect the current flowing onto respective LED channels; at least one channel current controller that generates control signal controlling the average current of the channels by comparing current detected from the channels with reference wave; and a switching element that controls the average current of the LED channels in a PWM scheme according to the control signals.

12 Claims, 4 Drawing Sheets

[FIG. 1]
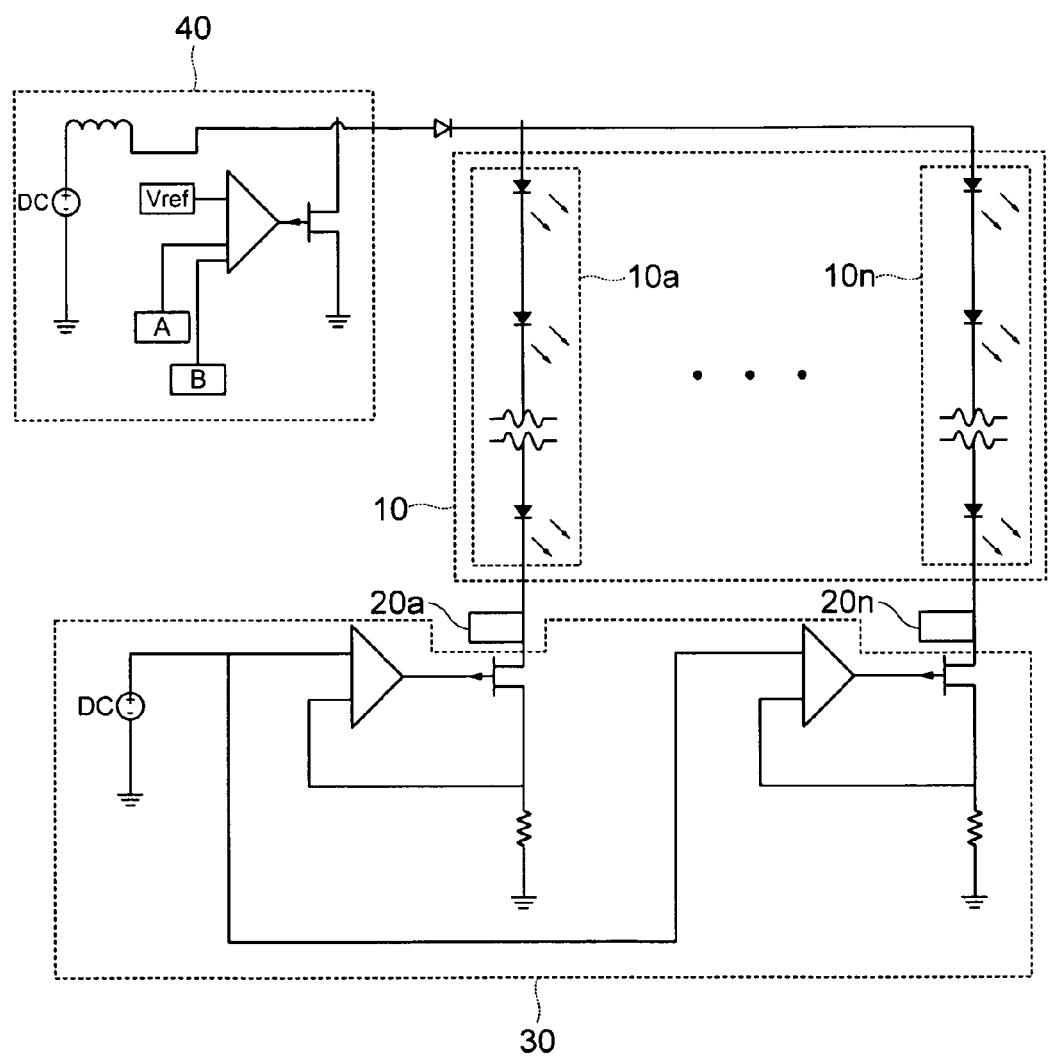
- PRIOR ART -

[FIG. 2]
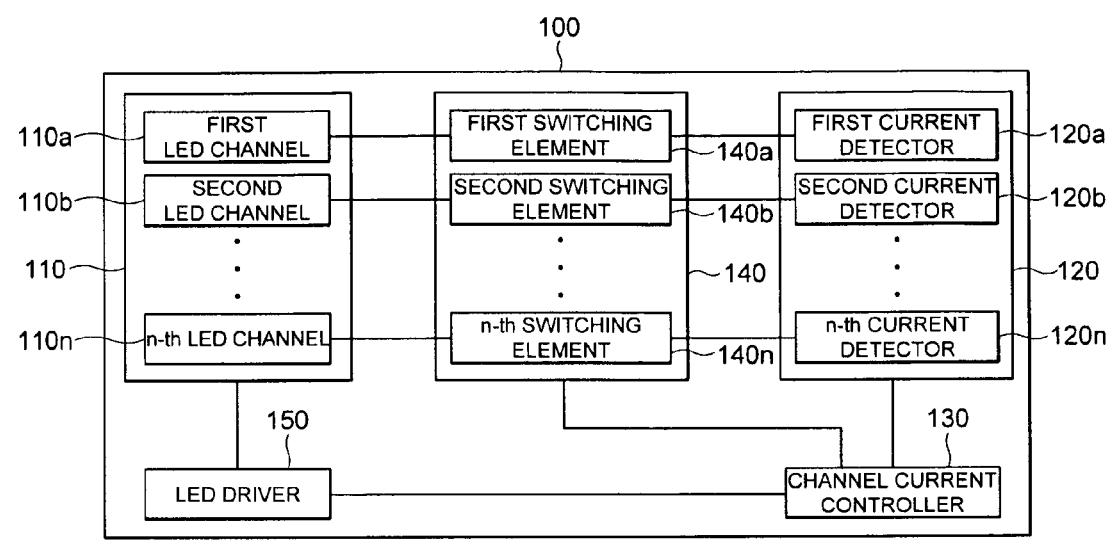

[FIG. 3]
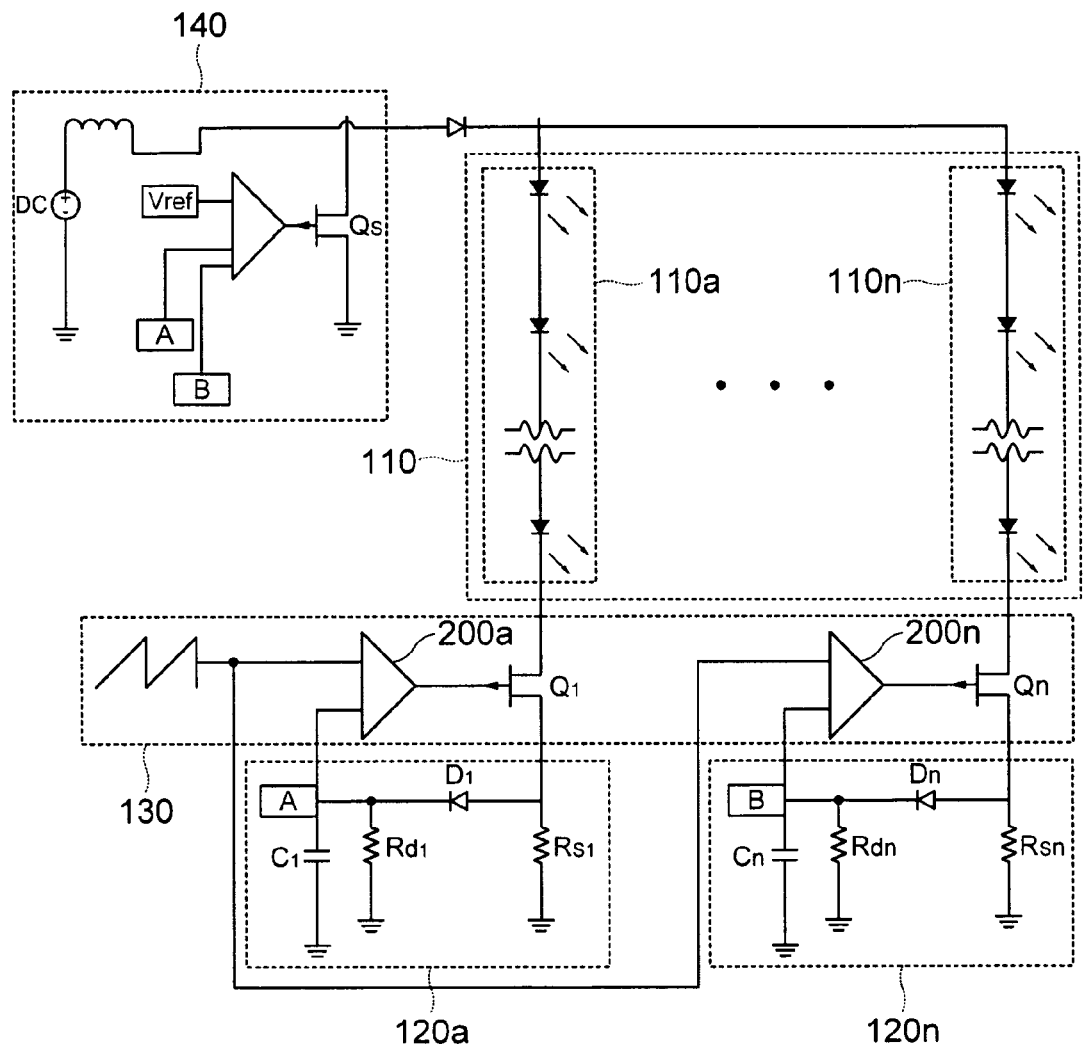

[FIG. 4]
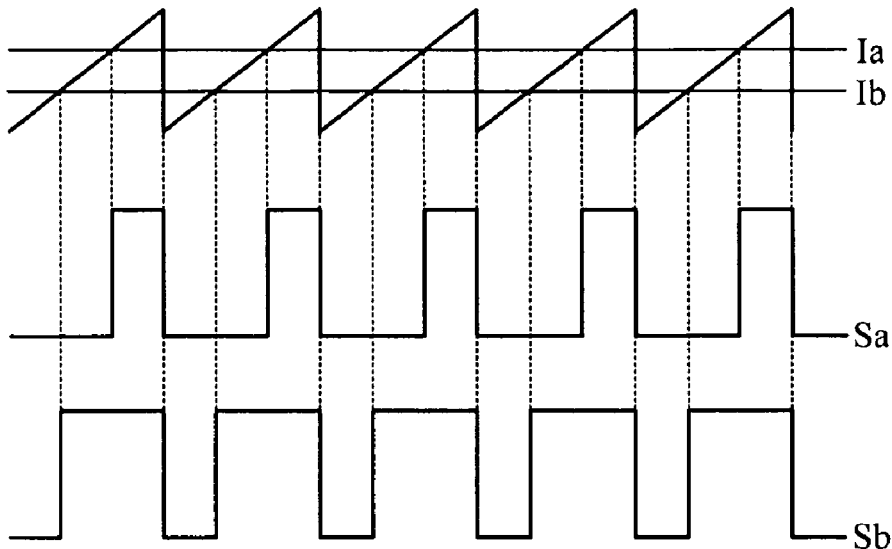
[FIG. 5]
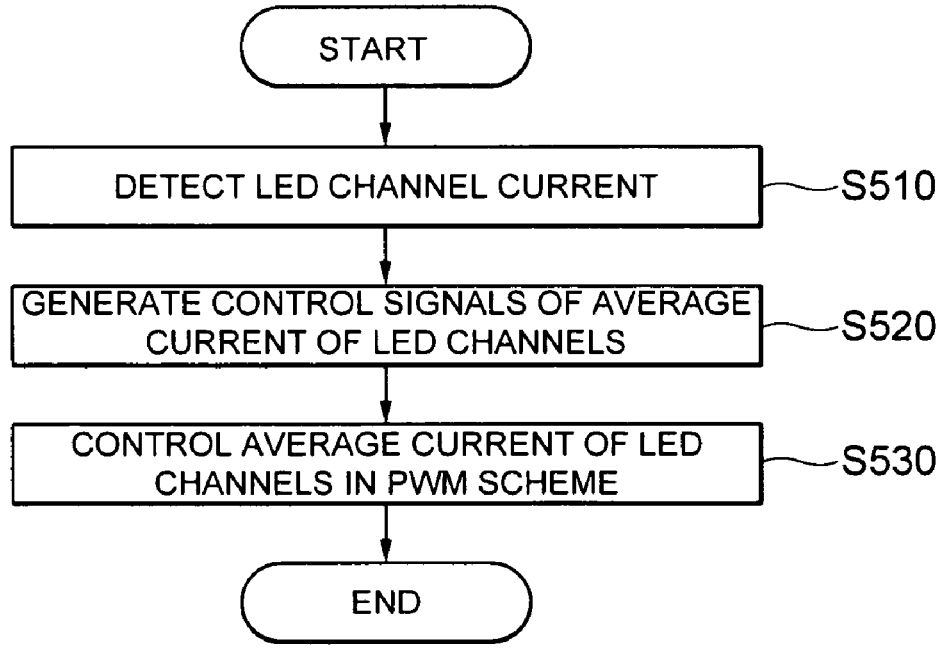

LIGHT EMITTING DEVICE DRIVING APPARATUS AND METHOD FOR DRIVING THE SAME

CROSS REFERENCES RELATED APPLICATIONS

The present application claims priority under 35 U.S.C. 119 and 35 U.S.C. 365 to Korean Patent Application No. 10-2009-0055071 (filed on Jun. 19, 2009), which is hereby incorporated by reference in its entirety.

BACKGROUND OF THE INVENTION

1. Field of the Invention

The present invention relates to a light emitting device (LED) driving apparatus that drives average current flowing on at least one LED channel to be constantly maintained, and more particularly, to a light emitting device (LED) driving apparatus that controls channel current to be constantly maintained by feedbacking channel current flowing on a driven LED channel and a method for driving the LED.

2. Description of the Related Art

Generally, a display device using a cathode-ray tube (CRT) is disadvantageous in that its entire volume becomes larger and its weight and installation area are increased in order to enlarge a display region, causing inconvenience in portability.

In order to solve the problem of such a CRT, a flat panel display having a thinner thickness and a lighter weight than the CRT has been developed. As such a flat panel display, there are a liquid crystal display (LCD), a plasma display panel (PDP), etc.

The LCD is generally configured of a liquid crystal panel and a backlight unit. As a lamp used in such a backlight unit, a cold cathode fluorescent lamp (CCFL) has been mainly used but owing to the limitations in view of compactization, thinning, and light-weighting, a light emitting diode (LED) which is advantageous in view of power consumption, weight, brightness, etc., has been proposed.

The backlight unit of the liquid crystal display panel uses a plurality of light emitting diodes which are connected in series as a light source and in this case, each light emitting diode has forward voltage deviation so that there is a demand for a driving apparatus that drives the plurality of light emitting diodes connected in series using constant current.

FIG. 1 is a circuit view of a LED driving apparatus in the related art.

Referring to FIG. 1, the LED driving apparatus according to the related art includes a LED light source unit 10, channel voltage detectors 20a to 20n, a channel current controller 30, and a driver 40.

Generally, each LED element is designed to have the same forward voltage, but differences occur in the forward voltage due to errors generated during a product manufacturing process. Therefore, there are also differences in voltage values detected from the low ends of the plurality of LED channels 10a to 10n.

The driver 40 uses a method to control boost voltage by comparing voltage measured from the low ends of the respective LED channels 10a to 10n with a reference potential in order to constantly adjust the voltage values in the low ends of the LED channels 10a to 10n measured from the channel voltage detectors 20a to 20n.

Moreover, the channel current controller 30 controls the average current flowing on the respective channels to be constantly maintained through a linear scheme. A transistor connected to the low ends of the channels is operated in an active region, such that the linear control method has a problem of heat generation as much as obtained by multiplying the voltage applied across the transistor by the current.

SUMMARY OF THE INVENTION

It is an object of the present invention to provide a light emitting device (LED) driving apparatus that constantly maintains average current flowing on each channel by controlling driving power duty of channels by comparing current detected from each channel with reference wave and a method for driving the LED.

According to one aspect of the present invention, there is provided a light emitting device (LED) driving apparatus, including: a LED light source unit in which at least one LED channel is connected in parallel; at least one current detector that is disposed on a low end of a LED channel of the LED light source unit to detect current flowing onto respective LED channels; at least one channel current controller that generates control signal controlling the average current of the channels by comparing the current detected from the channels with reference wave; and a switching element that controls the average current of the LED channels in a PWM scheme according to the control signals.

In addition, the LED driving apparatus according to the present invention further includes a LED driver that feedbacks and controls the current detected from the LED channels to generate the driving voltage of the LED channels.

Moreover, the channel current controller of the LED driving apparatus according to the present invention may be connected to at least one current detector and the switching element.

Further, the channel current controller of the LED driving apparatus according to the present invention may allow the duty of the switching element to be large when the detected channel current is large, and allow the duty of the switching element to be small when the detected channel current is small.

Also, the current detector of the LED driving apparatus according to the present invention has one end connected to a switching element connected to a low end of the LED channel and the other end connected to the comparator, and includes at least one resistor that senses the LED channel current.

Preferably, the reference wave is one of a reference triangle wave, a reference sine wave and a reference rectangle wave.

According to another aspect of the present invention, there is provided a method for driving a light emitting device (LED) that drives a plurality of LED channels connected in parallel, comprising: detecting channel current flowing onto the respective LED channels; generating PWM control signals that control the average current of the respective LED channels by comparing the respective detected channel current with reference wave; and switching the average current of the respective LED channels in a PWM scheme according to the control signals.

In addition, in the method for driving the LED according to the present invention, the PWM control signals that control the average current of the respective LED channels may control a switching element so that the average current flowing onto the respective LED channels becomes constant.

Further, in the method for driving the LED according to the present invention, the PWM control signals that control the average current of the respective LED channels may allow a duty ratio to be large when the channel current is larger than the other channel current and allow the duty ratio to be small when the channel current is smaller than the other channel current.

Moreover, the method for driving the LED according to the present invention further includes generating the driving voltage of the LED channels by feedbacking and controlling the channel current detected from the LED channels.

Preferably, the reference wave is one of a reference triangle wave, a reference sine wave and a reference rectangle wave.

BRIEF DESCRIPTION OF THE DRAWINGS

FIG. 1 is a circuit view of a LED driving apparatus in the related art;

FIG. 2 is a constitutional diagram of a LED driving apparatus according to an embodiment of the present invention;

FIG. 3 is a circuit view of the LED driving apparatus according to an embodiment of the present invention;

FIG. 4 is a waveform diagram of control signals of the LED driving apparatus according to an embodiment of the present invention; and FIG. 5 is a flowchart explaining a method for driving a LED according to an embodiment of the present invention.

<DESCRIPTION FOR KEY ELEMENTS IN THE DRAWINGS>

100: LED driving apparatus   110: LED light source unit
110a to 110n: First to n-th LED channels
120: Current detector
120a to 120n: First to n-th current detectors
130: Switching element
130a to 130n: First to n-th switching elements
140: Channel current controller
150: LED driver

DETAILED DESCRIPTION OF THE PREFERRED EMBODIMENTS

The present invention will now be described more fully hereinafter with reference to the accompanying drawings, in which exemplary embodiments of the invention are illustrated. The present invention may, however, be embodied in different forms and should not be construed as limited to the embodiments set forth herein. Rather, the present invention is intended to cover various modifications and equivalent arrangements included within the spirit and scope of the appended claims, and equivalent thereof.

Hereinafter, a light emitting device (hereinafter, referred to as 'LED') driving apparatus and a method for driving the same according to an embodiment of the present invention will be described in detail, and the same or corresponding constituents irrespective of drawing reference numerals will be given with the same reference numerals and the overlapped explanation thereof will be omitted.

FIG. 2 is a constitutional diagram of a LED driving apparatus according to an embodiment of the present invention, and FIG. 3 is a circuit view of the LED driving apparatus according to an embodiment of the present invention.

Referring to FIG. 2, the LED driving apparatus 100 includes a LED light source unit 110, a current detector 120, a channel current controller 130, a switching element 140, and a LED driver 150.

In the LED light source unit 110, at least one LED channel is connected in parallel, wherein in the LED channel, at least one LED may be connected in series or in parallel and, preferably, a plurality of LEDs are connected in series.

Generally, a brightness performance at a predetermined level should be satisfied in order to be used as a backlight light source of a display product, such that a LED array wherein a plurality of LEDs are connected in series is used.

According to the embodiment, in the LED light source unit 110, a plurality of LED channels (first to n-th LED channels 110a to 110n) to which n-th LED is connected in series are connected in parallel, wherein first to n-th switching elements 140a to 140n and first to n-th current detectors 120a to 120n are connected to low ends of the respective LED channels.

The first to n-th current detectors 120a to 120n of the current detector 120 are connected to low ends of the first to n-th LED channels 110a to 110n of the LED light source unit 110, respectively, thereby detecting current flowing onto the respective LED channels.

Referring to FIG. 3, one end of the first current detector 120a is connected to a first switching element $Q_1$ connected to a low end of the first LED channel 110a and the other end thereof is connected to a comparator 200a that generates reference wave. The first switching element $Q_1$ may use an element performing a switching function such as a BJT, a FET, etc.

Preferably, the reference wave is one of a reference triangle wave, a reference sine wave and a reference rectangle wave.

In the same manner, one ends of second to n-th current detectors 120b to 120n are connected to second to n-th switching elements $Q_2$ to $Q_n$ connected to low ends of second to n-th LED channels 110b to 110n, and the other ends thereof are connected to comparators 200a to 200n, respectively.

The first to n-th current detectors 120a to 120n may include sensing resistors $R_{s1}$ to $R_{sn}$ that detect current, diodes $d_1$ to $d_n$, discharge resistors $R_{d1}$ to $R_{dn}$, and capacitors $C_1$ to $C_n$, respectively, and can detect channel current using the sensing resistors $R_{s1}$ to $R_{sn}$.

The channel current controller 130 compares the current detected from the current detector 120 with the reference wave generated from a reference wave generator to control average current of the respective LED channels 110a to 110n. Since the method to control the average current is a method to control duty of a switching element 140 using a pulse width modulation (PWM) scheme, the switching element 140 is operated in a saturation region to have low voltage applied across the switching element 140, making it possible to reduce conduction loss.

The channel current controller 130 is connected to comparators 200a to 200n that compares the reference wave with the detected channel current, the current detector 120, the switching element 140, and the LED driver 150.

When the channel current detected from the current detector 120 is large, the channel current is reduced by controlling on/off duty ratio of the switching element 140 to be large, and when the detected channel current is small, the channel current is increased by controlling the on/off duty ratio of the switching element 140 to be small and controlling the duty of the channel driving power to be small, thereby making it possible to constantly maintain the average current flowing onto the respective LED channels 110.

The driver 150 feedbacks and controls the channel current detected from the current detector 120 to generate control driving voltage of the LED channel 110.

In the related art, the average current flowing onto the respective channels are controlled using voltage values of the low ends of the channels in a linear method and the voltage values are fedback and controlled to generate the driving power of the LED channels. To the contrary, in the method for driving the LED of the present invention, the average current flowing onto the respective channels are controlled using the PWM control method of the switching element by detecting current values flowing onto the low ends of the channels, and the current values are fedback and controlled to generate the driving power of the LED channels. Therefore, the present invention can solve the problem of heating of the switching element that constantly controls the average current flowing onto the LED channels.

FIG. 4 is a waveform diagram of control signals of the LED driving apparatus according to an embodiment of the present invention.

Referring to FIG. 4, waveforms of the PWM control signals generated by comparing the reference wave generated from the wave generator with the current detected from the low ends of the respective LED channels are related to the magnitude of the channel current.

In other words, when the channel current is large $I_a$, the PWM control signal $S_a$ controls a time rendered in turning "on" the switching element in the low end of the LED channel to be short and a time rendered in turning "off" the switching element to be long, to the contrary, when the channel current is small $I_b$, the PWM control signal $S_b$ controls a time rendered in turning "on" the switching element in the low end of the LED channel to be long and a time rendered in turning "off" the switching element to be short, thereby making it possible to constantly maintain the average current flowing onto the respective LED channels.

In the related art, there has been a problem that LED elements having predetermined forward voltage values should be used by measuring forward voltage values of the respective LED elements connected to the LED channels in order to constantly maintain the brightness of the respective LED channels and solve the problem of heating of the transistor. However, the LED driving apparatus according to the present invention can constantly maintain the average current values flowing onto the entire channels irrespective of the forward voltage values of the respective LEDs.

In addition, in the LED driving apparatus according to the present invention, the switching element connected to the low end of the LED channel is operated in the saturation region so that the difference in voltage applied across the switching element can be controlled to be low, making it possible to solve the problem of heating.

FIG. 5 is a flowchart explaining a method for driving a LED according to an embodiment of the present invention.

The method for driving the LED that drives a plurality of light emitting device (LED) channels connected in parallel includes: detecting channel current flowing onto the respective LED channels (S510); generating PWM control signals that control average current of the respective LED channels by comparing the respective detected channel current with reference wave (S520); and switching the average current of the respective LED channels in a PWM scheme according to the control signals (S530).

In the generating the PWM control signals that control average current of the respective LED channels (S520) according to the embodiment of the present invention, a PWM duty ratio is controlled so that the average current flowing onto the respective LED channels are controlled to be constant.

Moreover, in the generating the PWM control signals that control average current of the respective LED channels (S520), the duty ratio is generated to be large when the channel current is larger than other channel current and the duty ratio is generated to be small when the channel current is smaller than other channel current.

The channel current detected from the respective LED channels are fedback and controlled, thereby generating the driving voltage of the LED channels.

With the embodiment of the present invention, the average current of the channels is controlled in a PWM control scheme by comparing the current detected from each channel with the reference wave so that the switching element connected to the low ends of the channels is operated in a saturation region to lower the voltage applied across the switching element, making it possible to solve the problem of heating.

In addition, there is no need to limit the LEDs that constitute each channel to the LEDs having the same forward voltage value and the average current flowing on each channel is able to be constantly maintained in a PWM control scheme, making it possible to minimize the effects of the forward voltage value of the LED element.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A light emitting device (LED) driving apparatus, comprising:
   a LED light source unit in which at least one LED channel is connected in parallel;
   at least one current detector that is disposed on a low end of a LED channel of the LED light source unit to detect current flowing onto respective LED channels;
   at least one channel current controller that generates control signal controlling the average current of the channels by comparing the current detected from the channels with reference wave; and
   a switching element that controls the average current of the LED channels in a PWM scheme according to the control signals.

2. The LED driving apparatus according to claim 1, further comprising:
   a LED driver that feedbacks and controls the current detected from the LED channels to generate the driving voltage of the LED channels.

3. The LED driving apparatus according to claim 1, wherein the channel current controller is connected to at least one current detector and the switching element.

4. The LED driving apparatus according to claim 1, wherein the channel current controller allows the duty of the switching element to be large when the detected channel current is large, and allows the duty of the switching element to be small when the detected channel current is small.

5. The LED driving apparatus according to claim 1, wherein the channel current controller further includes a comparator that compares the current detected from the channels with the reference wave.

6. The LED driving apparatus according to claim 5, wherein the current detector has one end connected to a switching element connected to a low end of the LED channel and the other end connected to the comparator, and includes at least one resistor that senses the LED channel current.

7. The LED driving apparatus according to claim 1, wherein the reference wave is one of a reference triangle wave, a reference sine wave and a reference rectangle wave.

8. A method for driving a light emitting device (LED) that drives a plurality of LED channels connected in parallel, comprising:
   detecting channel current flowing onto the respective LED channels;

generating PWM control signals that control the average current of the respective LED channels by comparing the respective detected channel current with reference wave; and switching the average current of the respective LED channels in a PWM scheme according to the control signals.

9. The method for driving the LED according to claim 8, wherein the PWM control signals that control the average current of the respective LED channels allows a duty ratio to be large when the channel current is larger than the other channel current and allows the duty ratio to be small when the channel current is smaller than the other channel current.

10. The method for driving the LED according to claim 8, further comprising:

generating the driving voltage of the LED channels by feedbacking and controlling the channel current detected from the respective LED channels.

11. The method for driving the LED according to claim 8, wherein the PWM control signals that control the average current of the respective LED channels control a switching element so that the average current flowing onto the respective LED channels becomes constant.

12. The method for driving the LED according to claim 8, wherein the reference wave is one of a reference triangle wave, a reference sine wave and a reference rectangle wave.

* * * * *